United States Patent
Curchod

Patent Number: 5,770,122
Date of Patent: Jun. 23, 1998

[54] ROLL FORMER FOR AN EXTRUDED FRESNEL LENS

[76] Inventor: Donald B. Curchod, 1023 Los Trancos Rd., Portola Valley, Calif. 94028

[21] Appl. No.: 834,650

[22] Filed: Apr. 11, 1997

[51] Int. Cl.[6] ............................................. B29D 11/00

[52] U.S. Cl. .................. 264/2.7; 264/1.6; 264/210.2; 264/284; 425/327; 425/343; 425/363; 425/367; 425/385; 425/808

[58] Field of Search .............................. 264/1.6, 1.9, 2.7, 264/210.2, 284, 283; 425/327, 343, 363, 367, 385, 808, 328

[56] References Cited

U.S. PATENT DOCUMENTS

| | | | |
|---|---|---|---|
| 2,562,078 | 7/1951 | Winnck | 425/385 |
| 2,694,226 | 11/1954 | Luboshez | 425/385 |
| 3,146,492 | 9/1964 | Lemelson | 264/1.6 |
| 3,348,264 | 10/1967 | Rice et al. | 425/305 |
| 4,528,148 | 7/1985 | Dotti | 264/2.7 |
| 5,656,209 | 8/1997 | Benz et al. | 264/1.6 |

*Primary Examiner*—Mathieu D. Vargot
*Attorney, Agent, or Firm*—Patrick T. King

[57] ABSTRACT

Roll-forming apparatus and method for more precisely shaping an extruded-plastic Fresnel lens. A drive/support roller is rotatably mounted to the support frame and the surface of which engages and rotates to support the smooth outer surface of an extruded arcuate, elongated linear Fresnel lens. A tooth-forming roller is rotatably mounted to the support frame and has an external profile with tooth-forming projections formed thereon for engagement with the grooves on the inner surface of the extruded sheet, said tooth-forming roller being positioned on the inner surface of the Fresnel lens opposite the drive/support roller and being loosely mounted on the support frame to track the grooves formed in the Fresnel lens to improve the profile of the lens section by sharpening the root radius and flattening the optical face of each lens section. The tooth-forming roller is rotatably mounted to a biased floating yoke assembly for rotation of the tooth-forming roller about an axis perpendicular to the longitudinal direction of the movement of the arcuate, elongated linear Fresnel lens and wherein the yoke assembly provides for movement of the tooth forming roller about a longitudinal axis which is aligned in the longitudinal direction of the movement of the arcuate, elongated linear Fresnel lens. A pressure piston applies force to the yoke frame through the second ball-and-socket joint member. The tooth-forming roller is formed as two separate independent roller segments which are mounted coaxially for separate side-by-side movement. To cover the entire width of the lens, rows of tooth-forming rollers and corresponding drive/support rollers are provided.

19 Claims, 9 Drawing Sheets

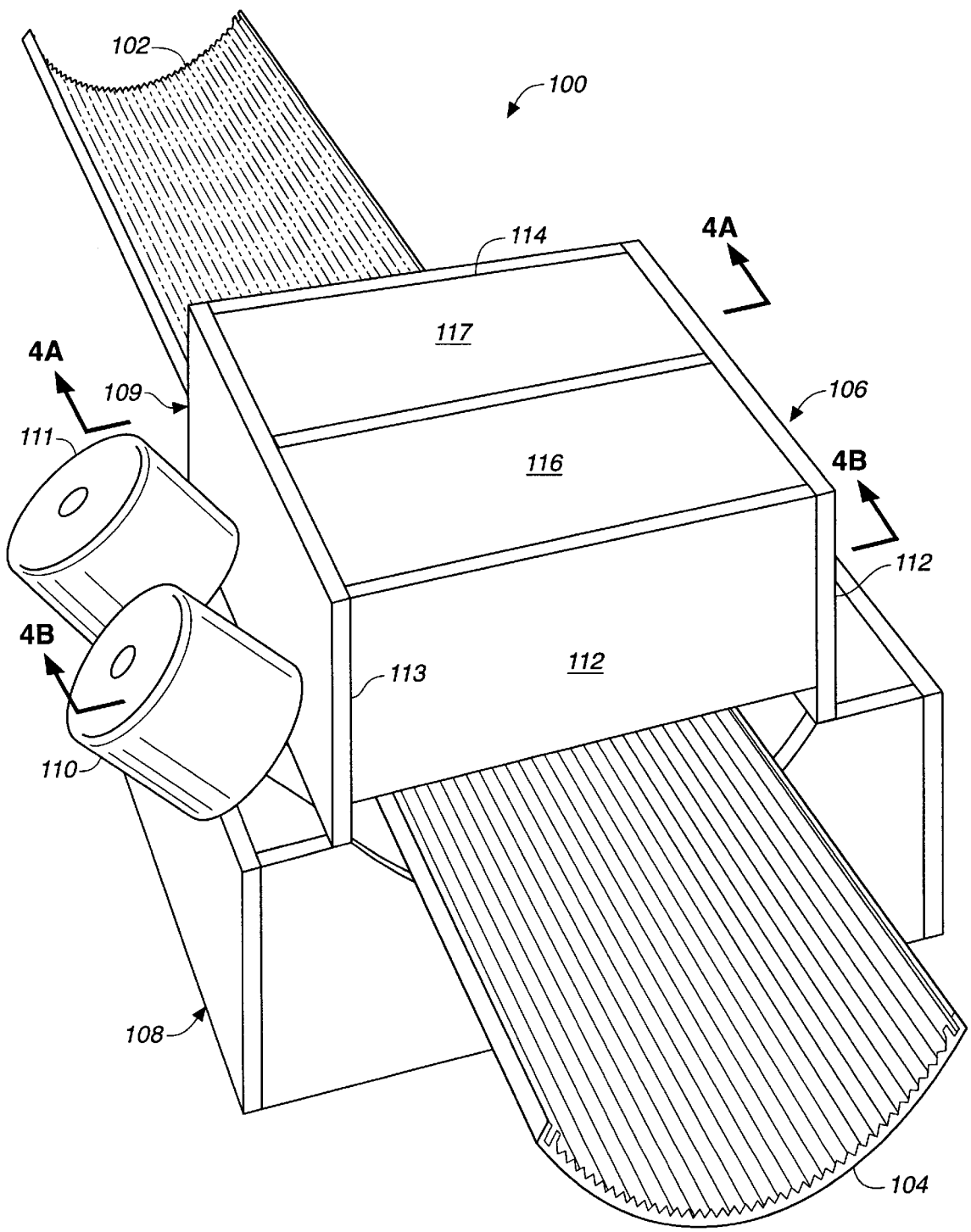
FIG._1

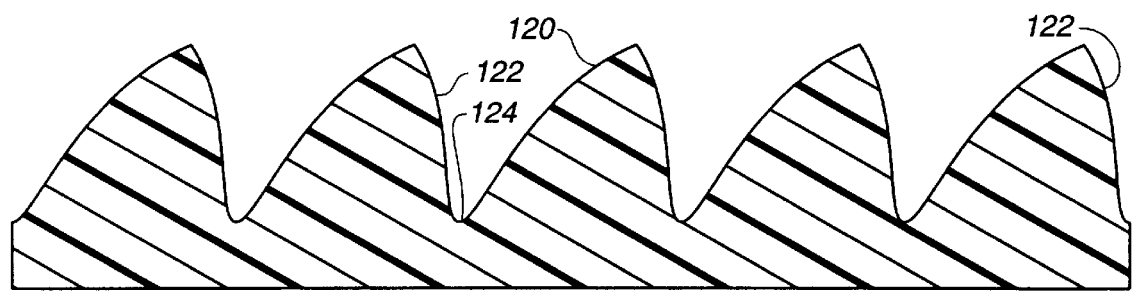
FIG._2A
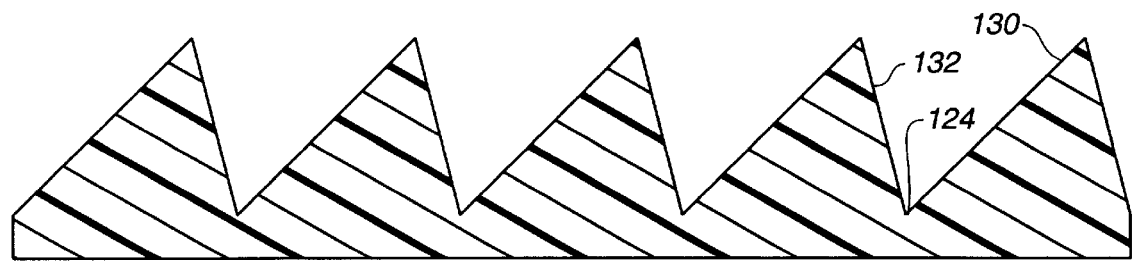
FIG._2B

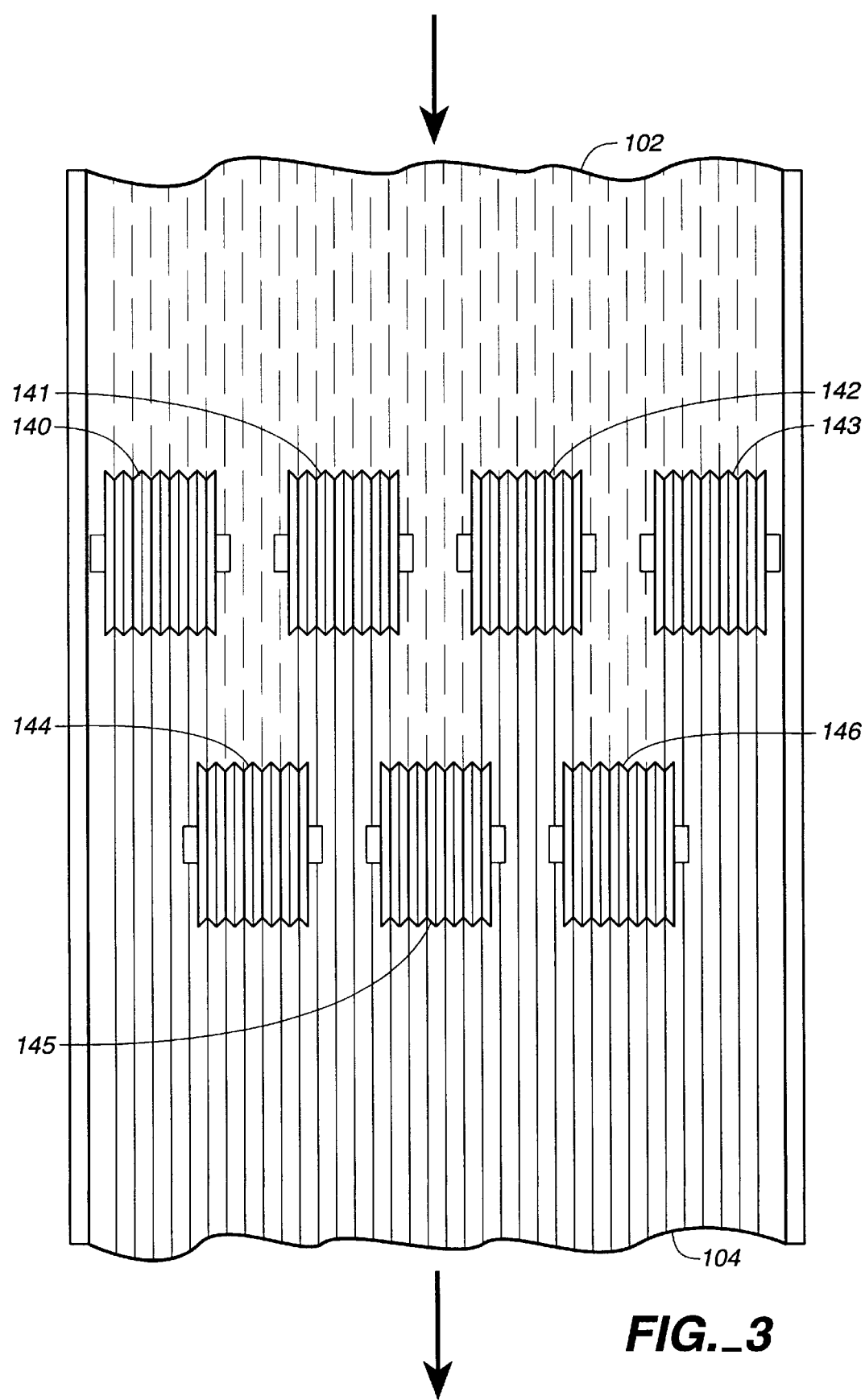
FIG._3

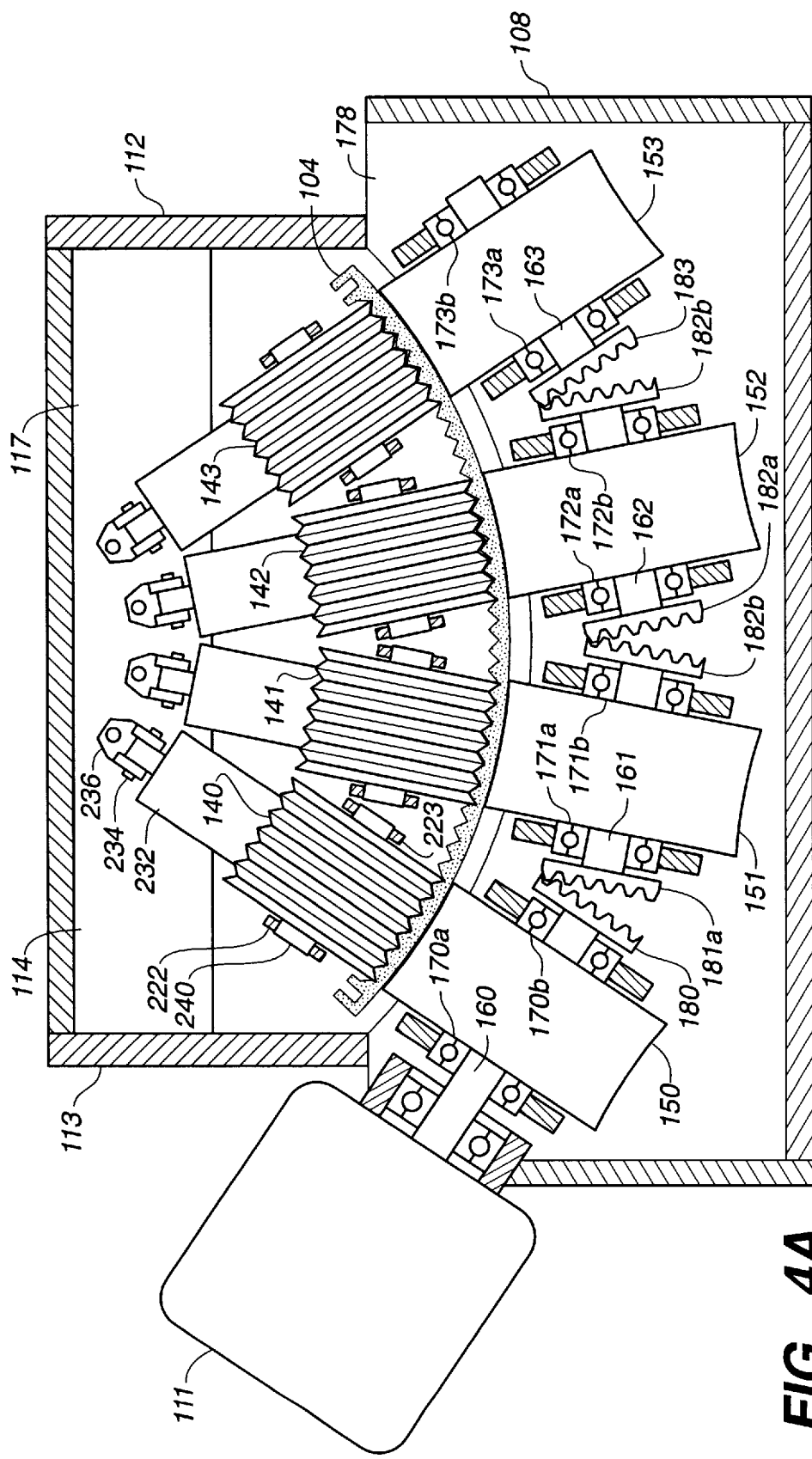
FIG._4A

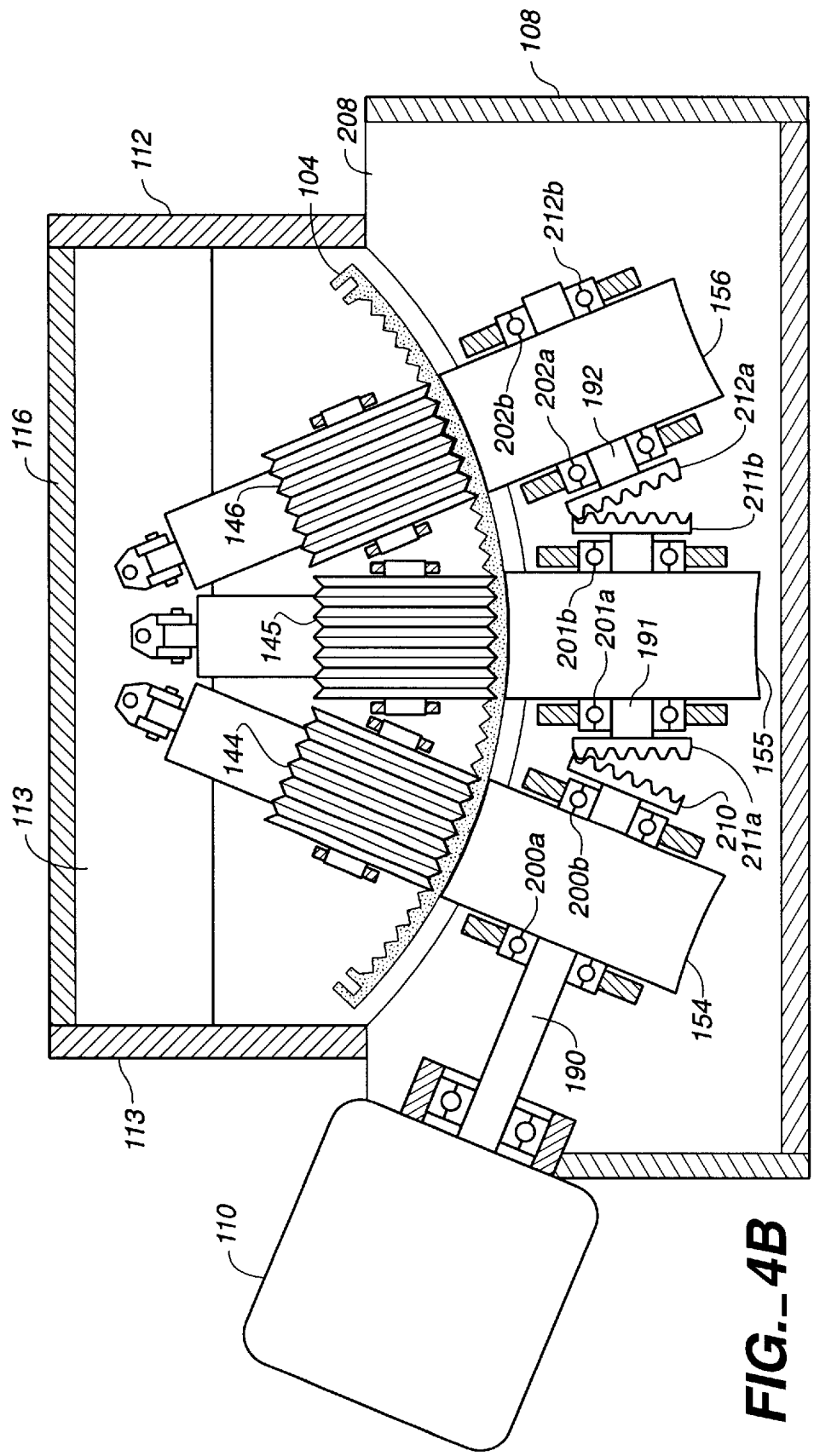
FIG._4B

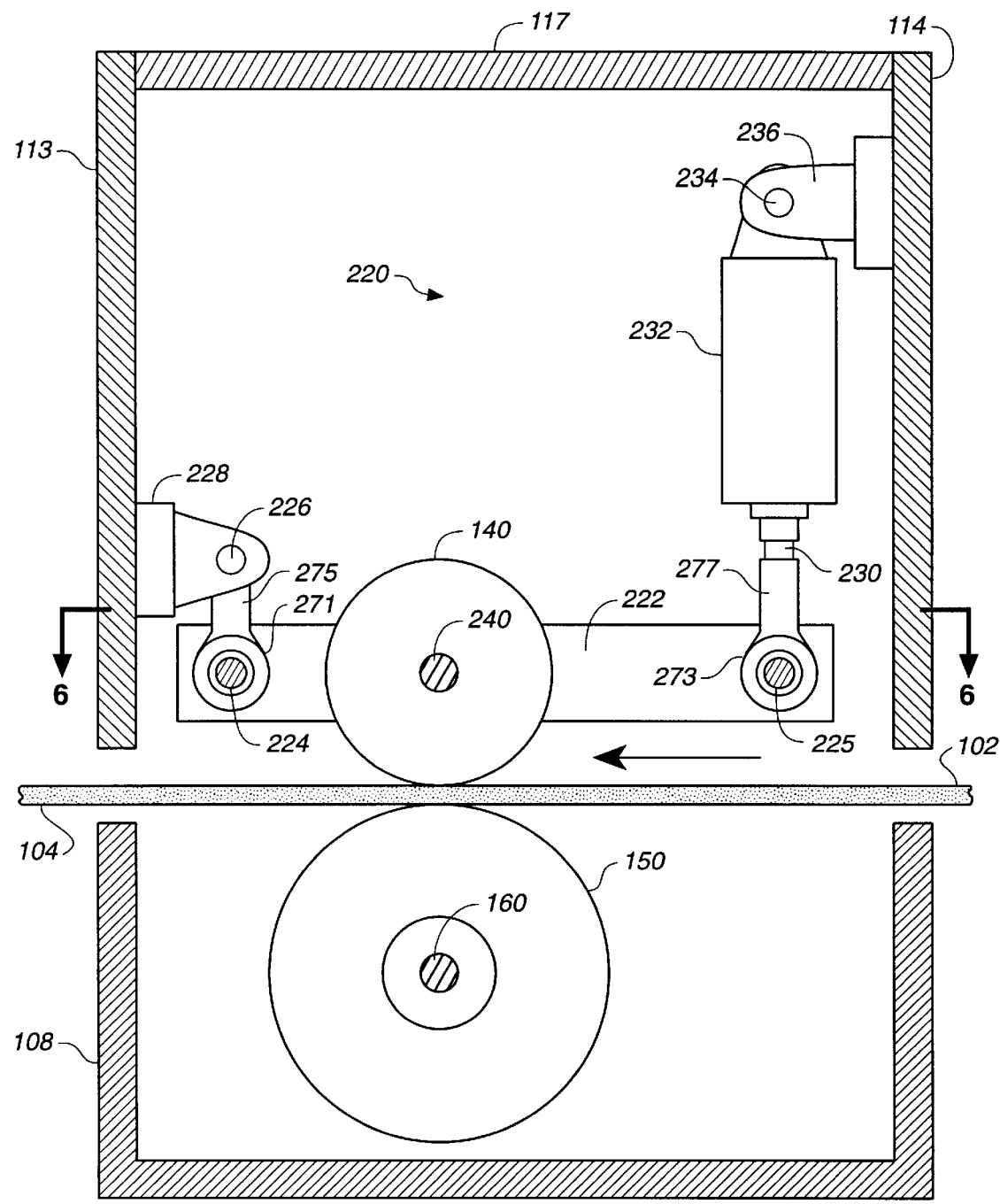
FIG._5

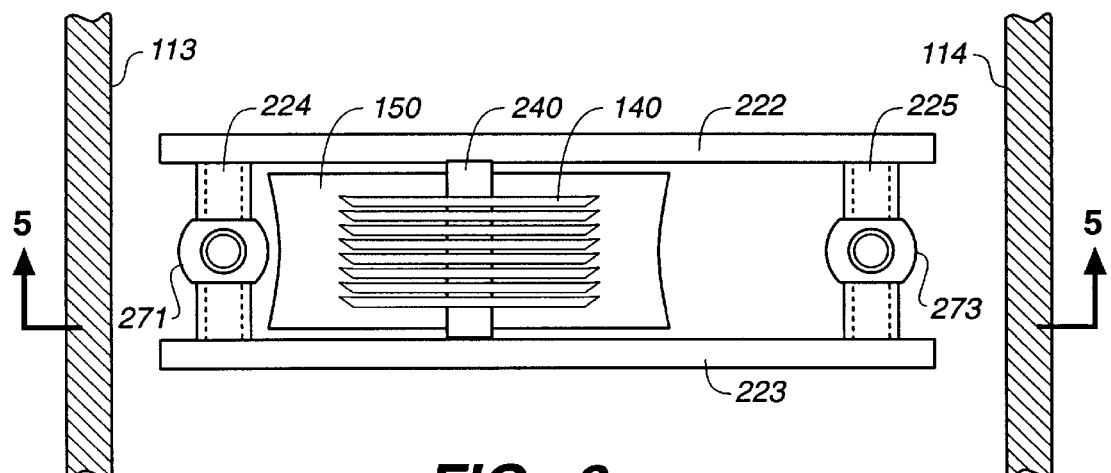
FIG._6
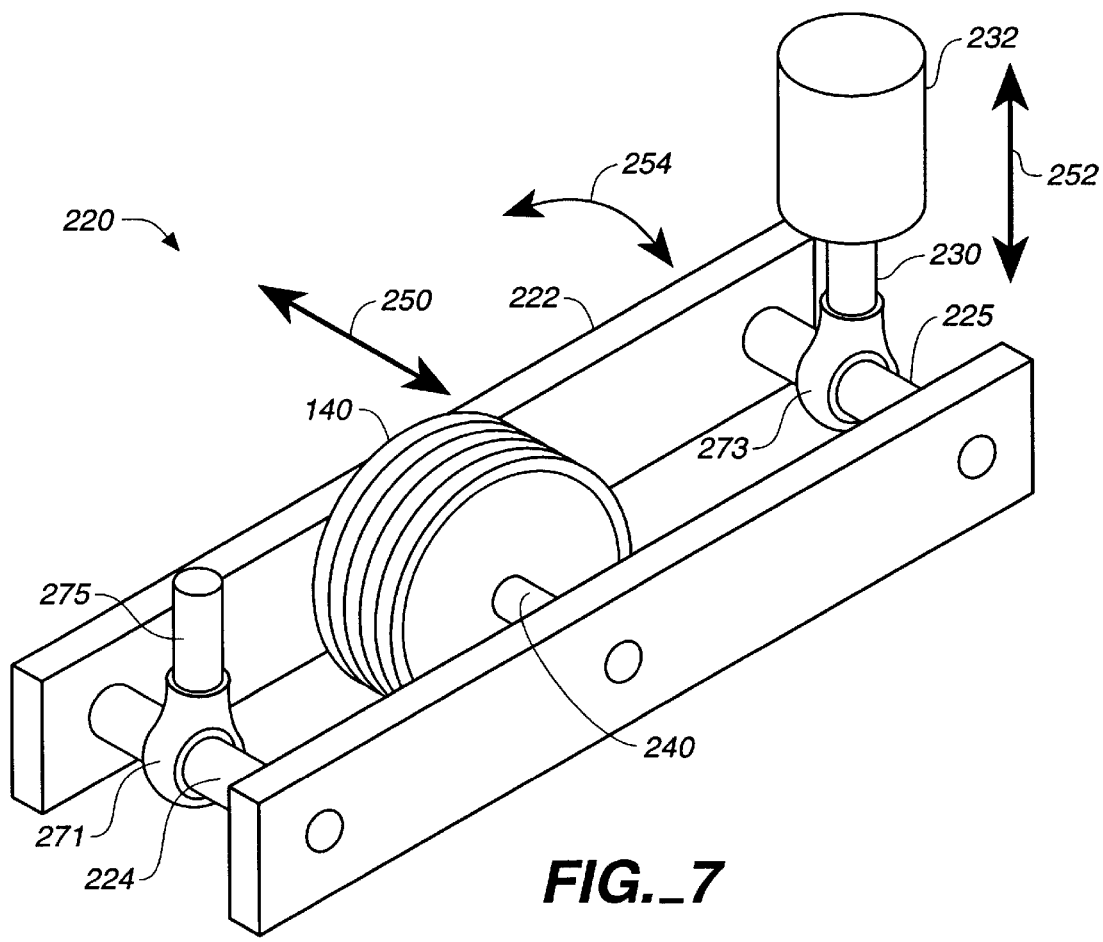
FIG._7

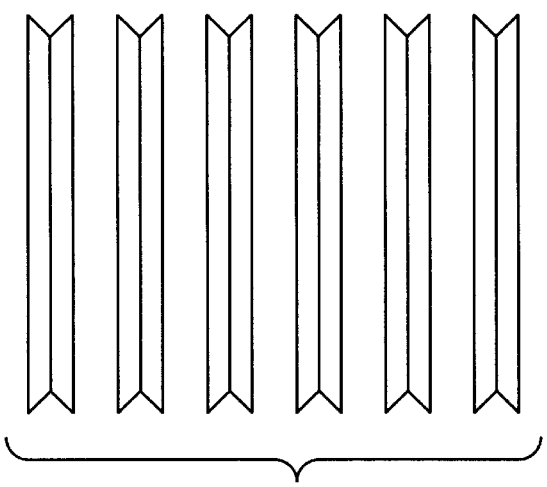
FIG._8A
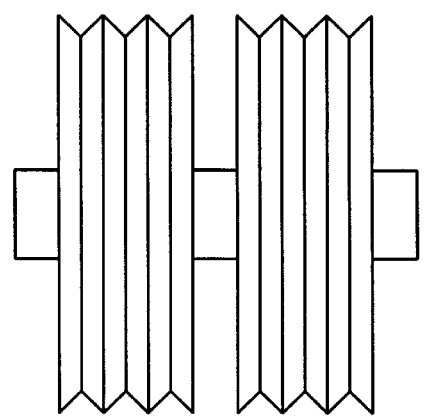
FIG._8B
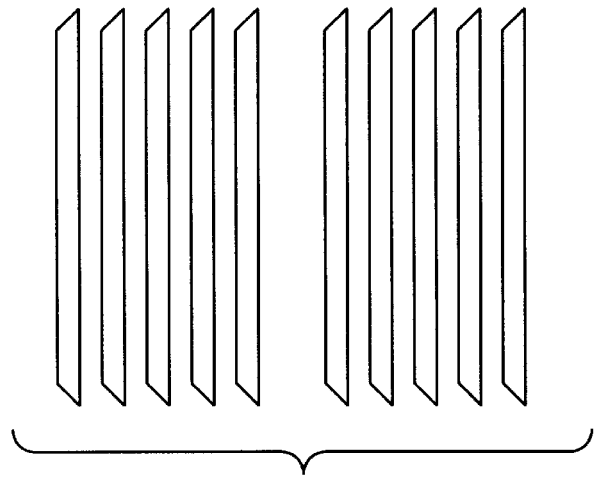
FIG._9A
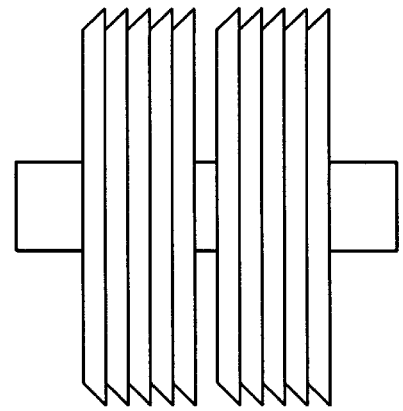
FIG._9B
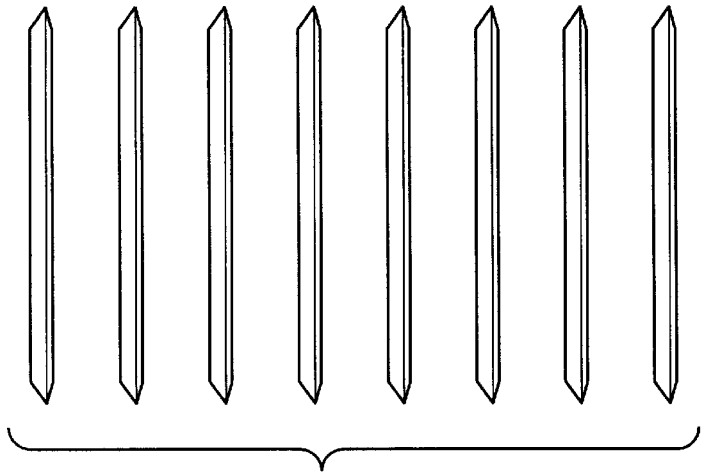
FIG._10A
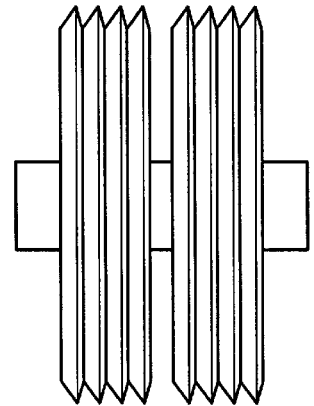
FIG._10B

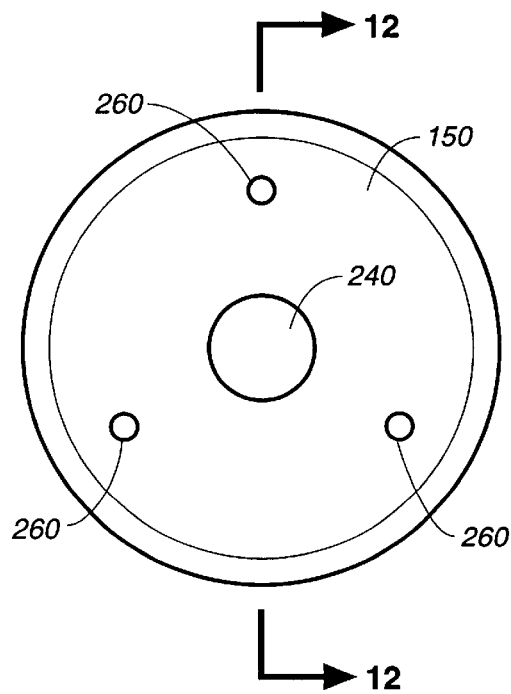
FIG._11
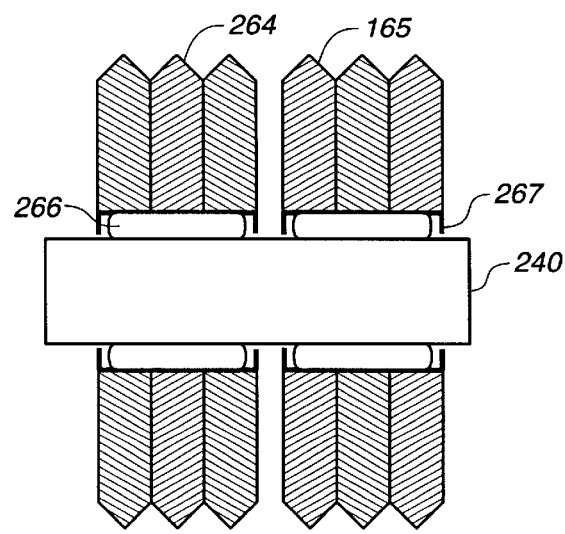
FIG._12
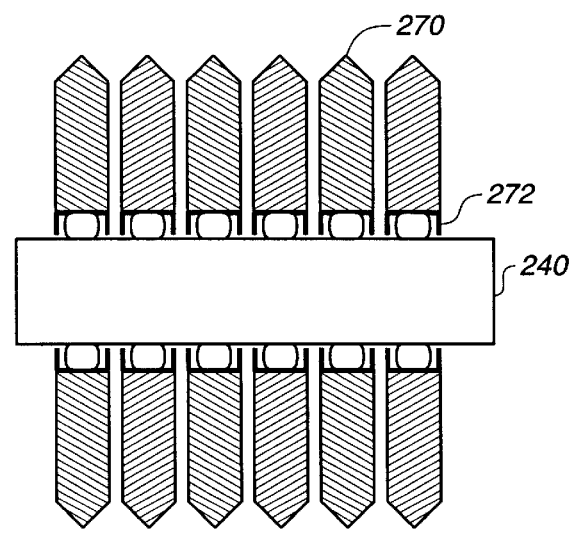
FIG._12A

ROLL FORMER FOR AN EXTRUDED FRESNEL LENS

BACKGROUND OF THE INVENTION

1. Field of the Invention

This invention relates to techniques for improving the efficiency of solar collection systems and, more particularly, to a roll former which shapes a more efficient extruded Fresnel lens for use with a solar energy collector system.

2. Prior Art

As is generally known, there exists in the world today a current energy crisis and a continuing rise in utility costs. As a result, there has been developed a high level of interest in the search for alternative energy sources with a main concentration in the area of solar technology. Various types of solar energy conversion systems here have been developed for converting solar energy to other forms of energy, such as electric energy, which can be stored and later manipulated and controlled, rather than immediately and directly utilizing the sun's rays.

One such conventional type of solar electric conversion unit is described and illustrated in U.S. Pat. No. 5,255,666 to Donald B. Curchod issued on Oct. 26, 1993, which is hereby incorporated by reference. In this patent, there is disclosed a solar energy conversion module assembly for converting sunlight to electrical energy. The module includes an elongated unitary body which is formed with an arcuate elongated acrylic Fresnel lens to which are fixed sidewalls and a pair of end caps. The sidewalls are angled toward each other and are spaced apart so as to form an open side to the assembly opposite the Fresnel lens. An elongated aluminum heat sink forms a closure for the open side opposite the Fresnel lens. A pair of pivot pins are attached to the end caps for rotation of the unit about its long axis. Energy converting devices such as photovoltaic cells are carried by the heat sink and are responsive to the receipt of sunlight falling thereupon for generating electrical energy.

The Fresnel lens for the above solar electric energy conversion unit is an arcuate, elongated sheet of extruded acrylic material which is extruded from melted acrylic material to, for example, approximately 14 feet in length and 20 inches in width. The outer surface of the arcuate Fresnel lens is smooth. The inner surface of the arcuate Fresnel lens is formed as a series of elongated, internal refracting prisms, facets, or lens sections, which are spaced side-by-side across the width of the lens on the inside face of the lens and which extend the length of the lens. Each prism section has a longer flat face and adjacent shorter return face. It has been found that raw extruded lens are not perfectly formed because the surfaces of the longer optical faces of the lens are somewhat rounded and the gullets formed at junction of the longer optical faces and the return faces are also rounded.

SUMMARY OF THE INVENTION

Accordingly, it is a general object of the present invention to provide an improved extruded Fresnel lens for a solar energy conversion unit which increases the overall conversion efficiency of the solar energy conversion unit.

In accordance with this object, the present invention provides an improved extruded Fresnel lens for a solar electric conversion unit .

The invention provides a roll-forming apparatus for shaping an extruded-plastic Fresnel lens.

An extruder provides a moving, extruded arcuate, elongated linear Fresnel lens as a sheet of thermoplastic material moving in a longitudinal direction, the outer surface of which is somewhat smooth and on the inner surface of which are formed a series of elongated grooves which serve as lens sections, which are spaced side-by-side across the width of the lens on the inner surface of the lens, and which extend the length of the lens, wherein each elongated lens section has a longer optical face and a shorter return face with a gullet being formed at the intersection of the optical face and the shorter face, wherein the surface of the longer optical face is somewhat rounded, and wherein a gullet with a root radius is formed at the lower junction of the longer optical face and the return face.

A drive/support roller is rotatably mounted to the support frame. The surface of the drive/support roller engages and rotates to support the smooth outer surface of the extruded arcuate, elongated linear Fresnel lens as the Fresnel lens moves in the longitudinal direction.

A tooth-forming roller, which is rotatably mounted to the support frame and which has an external profile with tooth-forming projections formed thereon for engagement with the grooves on the inner surface of the extruded sheet, said tooth-forming roller being positioned on the inner surface of the Fresnel lens opposite the drive/support roller and being loosely mounted on the support frame to track the grooves formed in the Fresnel lens to improve the profile of the lens section by sharpening the root radius and flattening the optical face of each lens section;

Means are provided for applying pressure to the rotatable tooth-forming roller to mold the acrylic material to sharpen the root radius and to flatten the optical surface of each lens section.

The tooth-forming roller is rotatably mounted to a floating yoke assembly for rotation of the tooth-forming roller about an axis perpendicular to the longitudinal direction of the movement of the arcuate, elongated linear Fresnel lens and wherein the yoke assembly provides for movement of the tooth forming roller about a longitudinal axis which is aligned in the longitudinal direction of the movement of the arcuate, elongated linear Fresnel lens.

The floating yoke assembly includes a first ball-and-socket joint member connected between the support and one end of a yoke frame and a second ball-and-socket joint member connected between the support frame and another end of the yoke frame and wherein the means for applying pressure to the tooth-forming roller includes a pressure piston for applying force to the yoke frame through the second ball-and-socket joint member.

The tooth-forming roller is formed as a series of adjacent disks, each having a tooth-forming projection formed at the outer circumference thereof, wherein said tooth-forming projections are complementary to a well-formed optical surface.

The tooth-forming roller is formed as one or more separate independent roller segments which are mounted coaxially on a bearing for separate side-by-side movement.

A plurality of spaced-apart tooth-forming rollers and a plurality of corresponding spaced-apart drive/support rollers which are mounted in rows side-by-side to extend across the width of the extended, accurate elongated linear Fresnel lens. A second plurality of spaced-apart tooth-forming rollers are spaced apart to cover the "spaces" between the first plurality.

The Fresnel lens is formed of extruded acrylic material. The drive/support rollers are coupled together for rotation together. A drive motor which is connected to drive the drive/support roller. The means for applying pressure to the rotatable tooth-forming roller to mold the acrylic material to sharpen the root radius and flatten the optical surface of each lens section includes a pressure piston.

The invention provides a roll-forming apparatus for shaping a plastic Fresnel lens, which is formed by extruding of by other means. The roll-forming apparatus includes a tooth-forming roller which has an external profile with tooth-forming projections formed thereon for engagement with the grooves on the inner surface of the extruded sheet.

Means are provided for mounting the tooth-forming roller to accommodate dimensional variations in the extended Fresnel lens. The mounting provides provide longitudinal rotation of the roller about a longitudinal axis of movement of a sheet of thermoplastic material having a grooved surface. The mounting also provides for movement up and down of the tooth-forming roller from the grooved surface of the extruded Fresnel lens. The mounting also provides side-to-side movement and side-to-side rocking of the tooth-forming roller.

The tooth-forming roller is positioned on the inner surface of the Fresnel lens opposite the drive/support roller and being loosely mounted on the support frame to track the grooves formed in the Fresnel lens to improve the profile of the lens section by sharpening the root radius and flattening the optical face of each lens section. A support roller is located opposite the tooth-formed roller. Means are provided for applying pressure to the rotatable tooth-forming roller to mold the acrylic material to thereby sharpen the root radius and to flatten the optical surface of each lens section includes a yoke assembly to which the tooth-forming roller is rotatably mounted. The yoke assembly includes a pair of ball joints to provide longitudinal and transverse rotation of the tooth-forming roller.

A method of increasing the efficiency of an extruded-plastic Fresnel lens is provided according to the invention which includes the steps of providing a moving, extruded arcuate, elongated linear Fresnel lens formed from a sheet of thermoplastic material moving in a longitudinal direction, the outer surface of which is smooth and on the inner surface of which are formed a series of elongated grooves which serve as lens sections, which are spaced side-by-side across the width of the lens on the inner surface of the lens, and which extend the length of the lens, wherein each elongated lens section has a longer optical face and a shorter return face with a gullet being formed at the intersection of the optical face and the shorter faces, wherein the surface of the longer optical face is somewhat rounded, and wherein a gullet with a root radius is formed at the lower junction of the longer optical face and the return face.

The sheet is supported with a drive/support roller, which is rotatably mounted to the support frame and the surface of which engages and rotates to supports the smooth outer surface of the extruded arcuate, elongated linear Fresnel lens as the Fresnel lens moves in the longitudinal direction.

A tooth is shaped in the sheet with a tooth-forming roller. The sheet to be shaped is formed, for, example, by extruding plastic material. The tooth-forming roller is mounted to provide rotation of the roller about the longitudinal axis and to provide movement up and down from the grooved surface of the extruded Fresnel lens. The tooth-forming roller can also roll from side-to-side by being mounted on ball joint. The tooth-forming roller is rotatably mounted to the support frame and which has an external profile with tooth-forming projections formed thereon for engagement with the grooves on the inner surface of the extruded sheet, said tooth-forming roller being positioned on the inner surface of the Fresnel lens opposite the drive/support roller and being loosely mounted on the support frame to track the grooves formed in the Fresnel lens to improve the profile of the lens section by sharpening the root radius and flattening the optical face of each lens section;

The method further includes the step of applying pressure to the rotatable tooth-forming roller to mold the acrylic material to sharpen the root radius and flatten the optical surface of each lens section.

One embodiment of the method includes the step of carrying the tooth-forming roller on a floating yoke assembly for rotation about an axis perpendicular to the longitudinal direction of the movement of the arcuate, elongated linear Fresnel lens and wherein the yoke assembly provides for movement of the tooth forming roller about a longitudinal axis which is aligned in the longitudinal direction of the movement of the arcuate, elongated linear Fresnel lens. The step of carrying the tooth-forming roller on a floating yoke assembly includes connecting a first ball-and-socket joint member between the support and one end of a yoke frame and connecting a second ball-and-socket joint member connected between the support frame and another end of the yoke frame.

The step of applying pressure to the tooth-forming roller includes using a pressure piston to apply force to the yoke frame through the second ball-and-socket joint member. The tooth-forming roller is formed as two separate independent roller segments which are mounted coaxially.

For forming a plurality of parallel teeth in the extruded sheet, a plurality of spaced-apart tooth-forming rollers and a plurality of spaced-apart corresponding drive/support rollers are provided.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a diagrammatic representation of apparatus for roll forming an extruded Fresnel lens.

FIG. 2A shows a typical cross-sectional profile of a raw extruded Fresnel lens prior to being roll-formed.

FIG. 2B shows a cross-sectional profile of an extruded Fresnel lens roll-formed according to the present invention.

FIG. 3 is a schematic plan view generally illustrating the arrangement of two rows of tooth-forming rollers for forming a sheet of extruded lens material, according to the invention.

FIG. 4A is a sectional, elevational view taken along section line 4A—4A of FIG. 1 and showing one set of tooth-forming rollers and motor-driven drive rollers for forming an extruded sheet of plastic material into a Fresnel lens, according to the invention.

FIG. 4B is also a sectional, elevational view taken along section line 4B—4B of FIG. 1 and showing another set of tooth-forming rollers and motor-driven drive rollers for forming an extruded sheet of plastic material into a Fresnel lens, according to the invention.

FIG. 5 is a side sectional view taken along section line 5—5 of FIG. 6 and showing a floating roller yoke assembly with a ball joint and pressure piston fixed to one end and a fixed ball joint fixed to the other end.

FIG. 6 is a top sectional view taken along section line 6—6 of FIG. 5 showing a floating roller yoke assembly for mounting tooth forming disks.

FIG. 7 is an isometric diagrammatic view of a floating yoke assembly for the tooth-forming roller illustrating lateral rotational, and elevational movement permitted to the tooth-forming roller as it tracks a raw extruded sheet of plastic lens material.

FIG. 8A is an exploded front elevational view showing a series of disks which are combined to form a tooth forming roller.

FIG. 8B is a front elevational view of an assembled tooth forming roller having two halves which can move laterally with respect to each other on a common shaft.

FIG. 9A is an exploded front elevational view showing another series of disks which are combined to form a tooth forming roller.

FIG. 9B is a front elevational view of an assembled tooth forming roller having two halves which can move laterally with respect to each other on a common shaft.

FIG. 10A is an front exploded elevational view showing still another series of disks which are combined to form a tooth forming roller.

FIG. 10B is a front elevational view of an assembled tooth forming roller having two halves which can move laterally with respect to each other on a common shaft.

FIG. 11 is a side elevational view of a typical tooth-forming roller.

FIG. 12 is a sectional view taken along section line 9—9 of FIG. 11 and generically showing two groups of tooth-forming disks rotatably mounted to a common shaft.

FIG. 12A is another sectional view alternatively showing a number of separate tooth-forming disks rotatably mounted to a common shaft.

It will be understood that, for purposes of clarity, certain elements may have been intentionally omitted from certain views where they are believed to be illustrated to better advantage in other views.

DESCRIPTION OF THE PREFERRED EMBODIMENTS

FIG. 1 is a diagrammatic representation of apparatus 100 for roll forming, shaping, or refining the shape of a raw extruded Fresnel lens 102 which is an arcuate, elongated sheet, or lens, 102 of extruded plastic material, such as, for example, acrylic in to a finished lens 104 which is continuously extruded to provide, for example, a lens 20 inches in width and cut to approximately 14 feet in length. The sheet of plastic material moves through the apparatus in the direction of the arrow indicated in the Figure.

The apparatus 100 includes a frame structure 106 having a lower support structure 108 on which is mounted an upper support structure 109 and two drive motors 110, 111. As illustrated, the upper support structure 109 includes front, middle, and rear support walls 112, 113, and 114 with recessed covers 116, 117.

The outer surface of the raw extruded arcuate Fresnel lens 102 is relatively smooth while its inner surface is formed as a series of elongated, internal refracting prisms, facets, or lens sections, which are spaced side-by-side across the width of the lens on the inside face of the lens and which extend the length of the lens. Each prism section has a longer flat face and adjacent shorter return face.

FIG. 2A shows typical cross-sectional profile of the "teeth", or grooves, of a raw extruded Fresnel lens 102 prior to being roll-formed or shaped according to the invention. The Fresnel lens 102 is originally formed as a plastic extrusion so that as the lens comes out of the extruder the longer flat face 120 and the shorter return face 122 are both somewhat rounded. In addition, the gullet 124 formed at the lower junction of the longer flat face and the return face is rounded. These roundings cause incident rays of sunlight to be misdirected away from the solar collecting surface covered by the lens and, consequently reduce the energy-collection efficiency of the solar energy collection system. The available optical efficiency of a conventionally-formed Fresnel lens is approximately 75%. Because any increase of the available optical efficiency would also increase the overall efficiency of the solar energy conversion system, it is desirable to increase the available optical efficiency of an extruded Fresnel lens used in connection with a solar energy conversion unit.

FIG. 2B shows a cross-sectional profile of an improved extruded Fresnel lens 104 which has been roll-formed, or precisely shaped, according to the present invention. It is seen that, in comparison to the cross-section of a raw extruded Fresnel lens as shown in FIG. 2A, the longer flat face 130 and the shorter return face 132 are both flatter. In addition, the gullet formed 134 at the lower junction of the longer flat face 130 and the return face 132 is deeper and sharper. This flatness and sharpness cause more incident rays of sunlight to be directed to the solar collecting surface covered by the lens and, consequently improves the energy-collection efficiency of the solar energy collection system. The available optical efficiency of the roll-formed Fresnel lens is improved to approximately 85 to 90%, which translates to a corresponding improvement in solar collection efficiency.

FIG. 3 is a schematic plan view generally illustrating the arrangement of two rows of tooth-forming, shaping, rollers 140–143 and 144–146 for forming a sheet 102 of extruded raw lens material into a finished lens 104, as the sheet of plastic material moves in the direction indicated by the arrow. As described herein below, the tooth forming rollers are mounted to track the teeth of the sheet 102. Note that there is a one-tooth overlap between rollers which are on adjacent tracks.

FIG. 4A shows the one set of tooth-forming rollers 140–143 and corresponding motor-driven support/drive rollers 150–153 for more precisely shaping an extruded sheet 102 of plastic material into a Fresnel lens 104, according to the invention. FIG. 4B similarly shows the other set of tooth-forming rollers 144–146 and corresponding motor-driven drive rollers for forming an extruded sheet 102 of plastic material into a Fresnel lens 104, according to the invention.

Referring to FIG. 4A, the motor-driven support/drive rollers 150–153 have surfaces which are contoured to the curved shape of the Fresnel lens to support the sheet 102 of plastic material being more precisely shaped by the tooth-forming rollers 140–143. The drive rollers 150–153 are mounted beneath the extruded sheet 102 of plastic material being formed into the Fresnel lens 104 to corresponding shafts 160–163. Each end of a shaft 160–163 is rotatably mounted on one of a corresponding pair of ball bearings 170a–170b, 171a–171b, 172a–172b, 173a–173b, which are mounted to a vertically extending interior support wall 178 in the lower support structure 108. One end of the shaft 160 is driven by the motor 111. The other end of the shaft 160 is fixed to a bevel gear 180 which engages a corresponding bevel gear 181a fixed to the one end of the shaft 161. The other end of the shaft 161 is fixed to a bevel gear 181b which engages a corresponding bevel gear 182a fixed to the one end of the shaft 162. The other end of the shaft 162 is fixed to a bevel gear 182b which engages a corresponding bevel gear 183 fixed to the one end of the shaft 163. All of the drive rollers 150–153 are driven by the drive motor 111 which is controlled to maintain proper speed and tension for the arcuate, elongated sheet 102 of extruded plastic material being drawn from the extruder and being shaped by the tooth-forming rollers 144–146.

Referring to FIG. 4B, the second set of motor-driven support/drive rollers 154–156 also have surfaces which are contoured to the curved shape of the Fresnel lens to support the sheet 102 of plastic material as it is being more precisely shaped by the tooth-forming rollers 144–146. The drive rollers 155–156 are mounted beneath the extruded sheet 102 of plastic material being formed into the Fresnel lens 104 to corresponding shafts 190–162. Each end of a shaft 190–192 is rotatably mounted on one of a corresponding pair of ball bearings 200a–200b, 201a–201b, 202a–202b, which are mounted to a vertically extending interior support wall 208 in the lower support structure 108. One end of the shaft 190 is driven by the motor 110. The other end of the shaft 190 is fixed to a bevel gear 210 which engages a corresponding bevel gear 211a fixed to the one end of the shaft 191. The other end of the shaft 191 is fixed to a bevel gear 211b which engages a corresponding bevel gear 212a fixed to the one end of the shaft 122. All of the drive rollers 154–156 are driven by the drive motor 110 which is also controlled to maintain proper speed and tension for the arcuate, elongated sheet 102 of extruded plastic material being drawn from the extruder and being shaped by the tooth-forming rollers 140–143.

FIGS. 5 and 6 illustrates a typical floating roller yoke assembly 220 for a tooth forming roller 140. The yoke assembly 220 is mounted to the upper support structure 109 of the frame structure 106, illustrated in FIG. 1. The yoke assembly 220 is mounted between the middle and rear support walls 113 and 114 of the upper support structure 109. The yoke assembly 220 is mounted above a corresponding support/drive roller (typically shown as 150). The yoke assembly includes a frame which includes a pair of elongated side bars 222, 223 at the ends of which are fixed the respective ends of two respective cylindrical support bars 222, 224.

Each of the cylindrical support bars 222, 224 has a respective ball and socket joint member 271/273 fixed at its midpoint and having respective connecting arms 275, 277 extending therefrom. The one connecting arm 275 has it distal end connected with a pin 226 to a yoke bracket 228, which is fixed to the middle support wall 113. The other connecting arm 225 has its distal end connected to a threaded adjustment rod 230 at one end of a pressure cylinder 232. The other end of the pressure cylinder 277 is connected with a pin 234 to a yoke bracket 236 which, which is fixed to the rear support wall 114. The pressure cylinder serves as a means for applying pressure to the rotatable tooth-forming roller 140 to more precisely shape and mold the acrylic material in order to sharpen the root radius and to flatten the optical surface of each lens section.

As discussed more in detail herein below, the typical tooth-forming roller 140 is mounted for rotation, lateral translation, and lateral rocking on a shaft 240 which extends between the mid portions of the side bars 222, 223 of the yoke assembly 240. The tooth-forming roller 140 has tooth-forming projections formed thereon for engagement with the grooves on the inner surface of the extruded sheet 102. The tooth-forming rollers are loosely mounted on the floating roller yoke assembly 220 and the yoke assembly 220 also moves to accommodate tracking of the grooves formed in the extruded Fresnel lens to thereby improve the profile of the lens section by sharpening the root radius and flattening the optical face of each lens section.

FIG. 7 is an isometric diagrammatic view illustrating various movements which the floating yoke assembly 220 and the tooth-forming roller 140 can make. Lateral movement of the tooth-forming roller is indicated by the horizontal arrow 250. Elevational movement of the yoke assembly 220 is indicated by the vertical arrow 252. Rocking of the yoke assembly 220 about an axis parallel to the longitudinal direction of the movement of the Fresnel lens is indicated by the 254. As described herein below, the tooth-forming roller can also be mounted to have a side-to-side rocking motion.

FIGS. 8A, 9A, and 10A are exploded views which show several typical profiles for disks which are combined to form tooth-forming rollers.

FIGS. 8B, 9B, and 10B show the various disks of FIGS. 8A, 9A, and 10A combined to form assembled tooth forming roller having two halves which can move laterally with respect to each other on a common shaft.

FIG. 11 show a side view of a typical tooth-forming roller 150 with the disks of each half section being held together with pins 260.

FIG. 12 is a sectional view taken along section line 12—12 of FIG. 11 and generically showing two groups 264, 265 of tooth-forming disks forming a single tooth-forming roller with each group mounted on a respective needle bearing 266, 267.

FIG. 12A is another sectional view alternatively showing a number of tooth-forming disks (typically shown as 270) with each disk mounted on a respective self-aligning needle bearing (typically shown as 272).

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

What is claimed is:

1. Roll-forming apparatus for shaping an extruded plastic Fresnel lens, comprising:

means for providing a moving, extruded arcuate, elongated linear Fresnel lens formed from thermoplastic material moving in a longitudinal direction, the outer surface of which is smooth and on the inner surface of which are formed a series of elongated grooves which serve as lens sections, which are spaced side-by-side across the width of the lens;

a support frame;

a drive/support roller, which is rotatably mounted to the support frame and the surface of which engages and rotates to support the smooth outer surface of the extruded arcuate, elongated linear Fresnel lens as the Fresnel lens moves in the longitudinal direction;

a tooth-forming roller, which is rotatably mounted to the support frame and which has an external profile with tooth-forming projections formed thereon for engagement with the grooves on the inner surface of the extruded sheet, said tooth-forming roller being positioned on the inner surface of the Fresnel lens opposite the drive/support roller and being loosely mounted on the support frame to forceably track the grooves formed in the Fresnel lens to improve the profile of the lens section by sharpening the root radius and flattening the optical face of each lens section.

2. The apparatus of claim 1 wherein the tooth-forming roller is rotatably mounted to a floating yoke assembly for rotation of the tooth-forming roller about an axis perpendicular to the longitudinal direction of the movement of the arcuate, elongated linear Fresnel lens and wherein the yoke assembly provides for movement of the tooth forming roller about a longitudinal axis which is aligned in the longitudinal direction of the movement of the arcuate, elongated linear Fresnel lens.

3. The apparatus of claim 2 wherein the floating yoke assembly includes a first ball-and-socket joint member connected between the support and one end of a yoke frame and a second ball-and-socket joint member connected between the support frame and another end of the yoke frame and wherein a means for applying pressure to the tooth-forming roller includes a pressure piston for applying force to the yoke frame through the second ball-and-socket joint member.

4. The apparatus of claim 1 wherein the tooth-forming roller is formed as a series of adjacent disks, each having a tooth-forming projection formed at the outer circumference thereof, wherein said tooth-forming projections are complementary to a well-formed optical surface.

5. The apparatus of claim 1 wherein the tooth-forming roller is formed as two separate independent roller segments which are mounted coaxially for separate side-by-side movement.

6. The apparatus of claim 1 including a plurality of spaced-apart tooth-forming rollers and a plurality of corresponding spaced-apart drive/support rollers which are respectively mounted side-by-side in a row to extend across the width of the extended, accurate elongated linear Fresnel lens.

7. The apparatus of claim 6 including a second plurality of spaced-apart tooth-forming rollers which are spaced apart to cover the spaces between the first plurality.

8. The apparatus of claim 6 wherein the drive/support rollers are coupled together for rotation together.

9. The apparatus of claim 1 including a drive motor which is connected to drive the drive/support roller.

10. The apparatus of claim 1 wherein means for applying pressure to the tooth-forming roller to sharpen the root radius and flatten the optical face of each lens section includes a pressure piston.

11. Roll-forming apparatus for shaping a plastic Fresnel lens, comprising:

a tooth-forming roller which has an external profile with tooth-forming projections formed thereon for engagement with grooves on the inner surface of a plastic sheet;

means for mounting the tooth-forming roller to accommodate dimensional variations in an extruded Fresnel lens to provide longitudinal rotation of the roller about a longitudinal axis of movement of an arcuate elongated linear Fresnel lens formed from a sheet of thermoplastic material and having a grooved surface and to provide movement up and down of the tooth-forming roller from the grooved surface of the extruded Fresnel lens, said tooth-forming roller being positioned on the inner surface of the Fresnel lens opposite a drive/support roller and being mounted for side-to-side movement on a bearing fixed to a support frame in order to track the grooves formed in the Fresnel lens to improve the profile of the lens section by sharpening the root radius and flattening the optical face of each lens section.

12. The apparatus of claim 11 wherein means applying pressure to the tooth-forming roller sharpen the root radius and to flatten the optical face of each lens section includes a pressure piston.

13. The apparatus of claim 11 wherein the mounting means includes a yoke assembly to which the tooth-forming roller is rotatably mounted, said yoke assembly including a pair of ball joints to provide longitudinal rotation of said tooth-forming roller.

14. A method of increasing the efficiency of an extruded plastic Fresnel lens, comprising the steps of:

providing a moving, extruded arcuate, elongated linear Fresnel lens formed from a sheet of thermoplastic material moving in a longitudinal direction, the outer surface of which is smooth and on the inner surface of which are formed a series of elongated grooves which serve as lens sections, which are spaced side-by-side across the width of the lens on the inner surface of the lens, and which extend the length of the lens, wherein each elongated lens section has a longer optical face and a shorter return face with a gullet being formed at the intersection of the optical face and the shorter faces, wherein the surface of the longer optical face is somewhat rounded, and wherein a gullet with a root radius is formed at the lower junction of the longer optical face and the return face;

supporting the sheet with a drive/support roller, which is rotatably mounted to a support frame and the surface of which engages and rotates to support the smooth outer surface of the extruded arcuate, elongated linear Fresnel lens as the Fresnel lens moves in the longitudinal direction;

forming a tooth in the sheet with a tooth-forming roller;

mounting the tooth-forming roller to provide rotation of the roller about the longitudinal axis and to provide movement up and down from the grooved surface of the extruded Fresnel lens, wherein the tooth-forming roller is rotatably mounted to the support frame and which has an external profile with tooth-forming projections formed thereon for engagement with the grooves on the inner surface of the extruded sheet, said tooth-forming roller being positioned on the inner surface of the Fresnel lens opposite the drive/support roller and being loosely mounted on the support frame to track the grooves formed in the Fresnel lens to improve the profile of the lens section by sharpening the root radius and flattening the optical face of each lens section;

applying pressure to the rotatable tooth-forming roller to mold the thermoplastic material to sharpen the root radius and flatten the optical face of each lens section.

15. The method of claim 14 including the step of carrying the tooth-forming roller on a floating yoke assembly for rotation about an axis perpendicular to the longitudinal direction of the movement of the arcuate, elongated linear Fresnel lens and wherein the yoke assembly provides for movement of the tooth-forming roller about a longitudinal axis which is aligned in the longitudinal direction of the movement of the arcuate, elongated linear Fresnel lens.

16. The method of claim 15 wherein the step of carrying the tooth-forming roller on a floating yoke assembly includes connecting a first ball-and-socket joint member between the support and one end of a yoke frame and connecting a second ball-and-socket joint member connected between the support frame and another end of the yoke frame.

17. The method of claim 14 wherein the step of applying pressure to the tooth-forming roller includes using a pressure piston to apply force to the yoke frame through the second ball-and-socket joint member.

18. The method of claim 14 wherein the tooth-forming roller is formed as two separate independent roller segments which are mounted coaxially.

19. The method of claim 14 including forming a plurality of parallel teeth in the extruded sheet with a plurality of spaced-apart tooth-forming rollers and a plurality of spaced-apart corresponding drive/support rollers.

\* \* \* \* \*